US009068323B2

(12) United States Patent
Peterson et al.

(10) Patent No.: US 9,068,323 B2
(45) Date of Patent: Jun. 30, 2015

(54) MACHINE HAVING HYDRAULICALLY ACTUATED IMPLEMENT SYSTEM WITH COMBINED RIDE CONTROL AND DOWNFORCE CONTROL SYSTEM

(71) Applicant: Caterpillar Inc., Peoria, IL (US)

(72) Inventors: Jeremy T. Peterson, Washington, IL (US); Jeffrey L. Kuehn, Germantown Hills, IL (US); David J. Lomax, Boilingbrook, IL (US); Michael L. Knussman, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 165 days.

(21) Appl. No.: 13/721,313

(22) Filed: Dec. 20, 2012

(65) Prior Publication Data

US 2014/0178164 A1 Jun. 26, 2014

(51) Int. Cl.

| | |
|---|---|
| ***G05D 1/02*** | (2006.01) |
| ***E02F 3/43*** | (2006.01) |
| ***E02F 9/08*** | (2006.01) |
| ***E02F 9/22*** | (2006.01) |
| ***F15B 1/02*** | (2006.01) |
| ***F15B 21/08*** | (2006.01) |
| *F15B 1/033* | (2006.01) |

(52) U.S. Cl.

CPC ............... *E02F 3/432* (2013.01); *E02F 9/0841* (2013.01); *E02F 9/2207* (2013.01); *E02F 9/2217* (2013.01); *F15B 1/021* (2013.01); *F15B 1/033* (2013.01); *F15B 21/082* (2013.01); *F15B 2211/625* (2013.01); *F15B 2211/6346* (2013.01); *F15B 2211/6653* (2013.01); *F15B 2211/6658* (2013.01); *F15B 2211/7128* (2013.01); *F15B 2211/85* (2013.01); *F15B 2211/8606* (2013.01); *F15B 2211/8616* (2013.01)

(58) Field of Classification Search

None

See application file for complete search history.

(56) References Cited

U.S. PATENT DOCUMENTS

| | | | |
|---|---|---|---|
| 5,052,883 | A | 10/1991 | Morita et al. |
| 6,389,953 | B1 | 5/2002 | Altman et al. |
| 6,757,994 | B1 | 7/2004 | Hendron |

(Continued)

FOREIGN PATENT DOCUMENTS

| | | |
|---|---|---|
| JP | 01-239231 | 9/1989 |

OTHER PUBLICATIONS

U.S. Appl. No. 13/278,788, Closed-Loop Hydraulic System Having Force Modulation, filed Oct. 21, 2011.

(Continued)

*Primary Examiner* — Adam Tissot

(74) *Attorney, Agent, or Firm* — William R. Tinker

(57) ABSTRACT

A machine is disclosed. The machine can include a frame and ground engaging propulsion elements coupled with the frame. A hydraulically actuated implement system can be coupled with the frame, and can include a linkage configured to couple with an implement, a hydraulic actuator coupled with the linkage and the frame, and a ride control and downforce control circuit configured to implement a ride control mode and a downforce control mode. The ride control mode can be configured to maintain a pressure of hydraulic fluid in the hydraulic actuator at a ride control pressure, and the downforce control mode can be configured to maintain the pressure of hydraulic fluid in the hydraulic actuator at a downforce control pressure to oppose the weight of the linkage and the implement such that the implement engages a substrate with a predetermined down force pressure which is proportionate to the downforce control pressure.

12 Claims, 4 Drawing Sheets

(56) References Cited

U.S. PATENT DOCUMENTS

| | | | | |
|---|---|---|---|---|
| 7,478,489 | B2 * | 1/2009 | Anderson et al. | 37/348 |
| 2004/0060711 | A1 | 4/2004 | Charles | |
| 2007/0056277 | A1 * | 3/2007 | Mizoguchi et al. | 60/413 |
| 2008/0250783 | A1 | 10/2008 | Griswold | |
| 2010/0043418 | A1 | 2/2010 | Verkuilen et al. | |
| 2010/0154401 | A1 | 6/2010 | Sullivan, Jr. et al. | |

OTHER PUBLICATIONS

U.S. Appl. No. 13/210,653, Machine Having Hydraulically Actuated Implement System With Down Force Control, and Method, filed Aug. 16, 2011.

* cited by examiner

MACHINE HAVING HYDRAULICALLY ACTUATED IMPLEMENT SYSTEM WITH COMBINED RIDE CONTROL AND DOWNFORCE CONTROL SYSTEM

TECHNICAL FIELD

The present disclosure is directed to a machine having a hydraulically actuated implement system, and more particularly, is directed to a hydraulically actuated implement system for a machine having a combined ride control and downforce control system.

BACKGROUND

Hydraulically actuated implement systems of many different types may be implemented in and utilized by a wide variety of machines, including but not limited to wheel loaders, track-type tractors, backhoes, and excavators. Furthermore, hydraulically actuated implement systems may be operatively associated with one or more of a variety of types of implements for digging, dozing, loading, spreading and other activities involving the manipulation of loose material and various other types of loads. Due to a variety of factors, manual operation and control of such implements and implement systems may be difficult or nearly impossible under certain operating conditions, and may result in damage to any one or more of the machine, the implement system, implement components or attachments, and/or the surface under which the machine traverses. As a result, electronic and/or automated control of these systems may provide assistance to operators and improve performance and control.

One example of an automated control strategy for a construction machine is known from U.S. Pat. No. 5,052,883 to Morita et al. In Morita et al., a work vehicle has an implement position controller. The controller is configured to automatically orient and position an implement, such as a bucket coupled with a linkage in a wheel loader. While Morita et al. appears to be an elegant strategy for attaining a pre-defined bucket orientation and position, especially for certain types of work cycles, there is always room for improvement, especially as new problems are recognized or created.

The present disclosure is directed to mitigating or eliminating one or more of the drawbacks discussed above.

SUMMARY

One aspect of the present disclosure is directed to a machine. The machine can include a frame and ground engaging propulsion elements coupled with the frame. A hydraulically actuated implement system can be coupled with the frame, and can include a linkage configured to couple with an implement, a hydraulic actuator coupled with the linkage and the frame, and a ride control and downforce control circuit configured to implement a ride control mode and a downforce control mode. The ride control mode can be configured to maintain a pressure of hydraulic fluid in the hydraulic actuator at a ride control pressure, and the downforce control mode can be configured to maintain the pressure of hydraulic fluid in the hydraulic actuator at a downforce control pressure to oppose the weight of the linkage and the implement such that the implement is controllably rested upon and engages a substrate positioned under the implement with a predetermined down force pressure which is proportionate to the downforce control pressure.

A further aspect of the present disclosure is directed to a hydraulically actuated implement system. The hydraulically actuated implement system can include a combined ride control and downforce control circuit which can be connected in fluid communication between a hydraulic pump and a hydraulic actuator. The combined ride control and downforce control circuit can include a switching valve and a pressure reducing valve. The switching valve can be connected in fluid communication between the pressure reducing valve and the hydraulic actuator, and the pressure reducing valve can be connected in fluid communication between the hydraulic pump and the switching valve.

Yet another aspect of the present disclosure is directed to a control system for a hydraulically actuated implement system in a machine. The control system can include an electronic control unit which can be in electronic communication with a combined ride control and downforce control circuit. The combined ride control and downforce control circuit can be connected in fluid communication between a hydraulic pump and a hydraulic actuator. The electronic control unit can be configured to receive a ride control activation command, and responsively actuate the ride control and downforce control circuit to a ride control mode. The ride control mode can maintain a pressure of hydraulic fluid in the hydraulic actuator at a ride control pressure. The electronic control unit can also be configured to receive a downforce control activation command, and responsively actuate the ride control and downforce control circuit to a downforce control mode. The downforce control mode can maintain the pressure of hydraulic fluid in the hydraulic actuator at a downforce control pressure to oppose the weight of a linkage and an implement such that the implement engages a substrate positioned under the implement with a down force pressure which is proportionate to the downforce control pressure.

DETAILED DESCRIPTION

Figure 1:
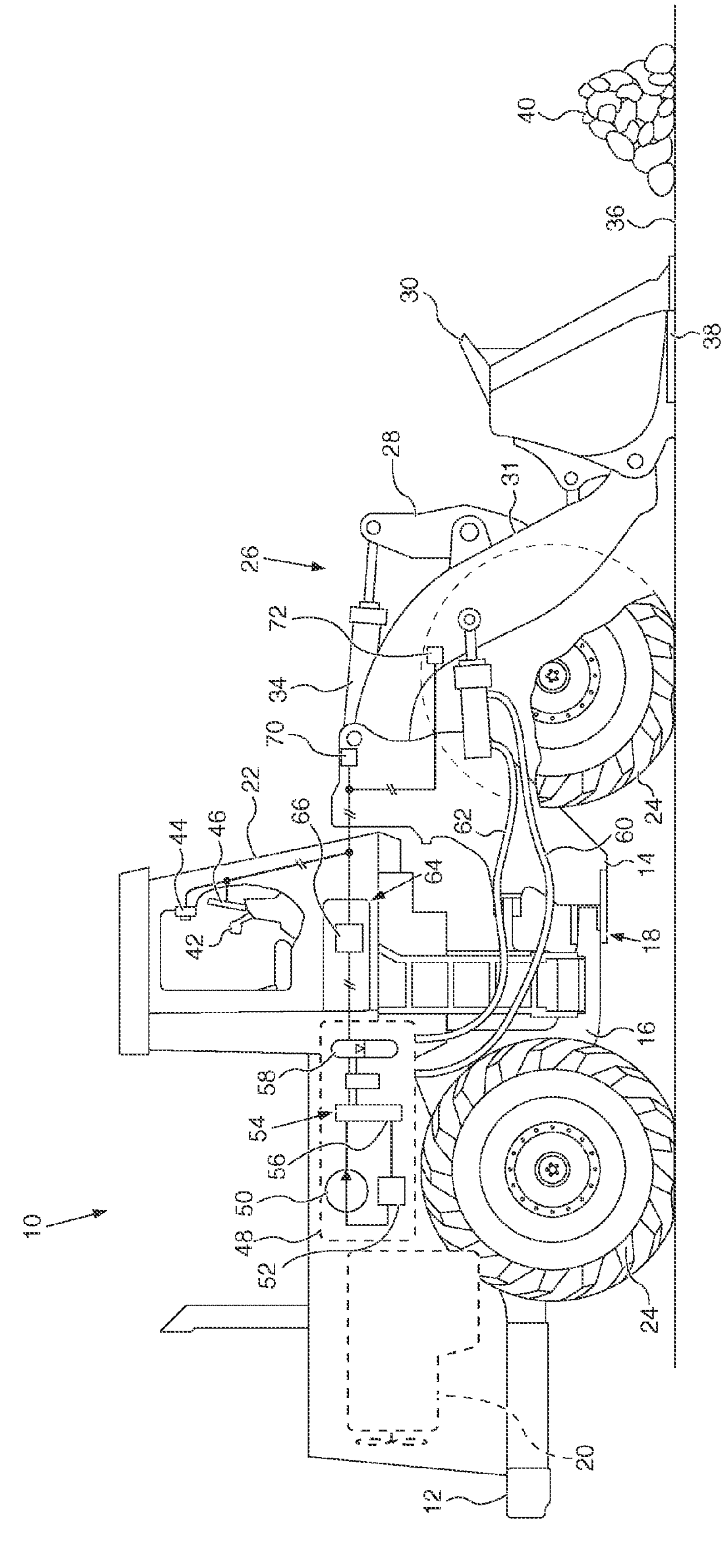
FIG. 1 is a side diagrammatic view of a machine, according to one embodiment.

Referring to FIG. 1, there is shown a machine 10 according to one embodiment. In one example, machine 10 may include a frame 12 having a front frame unit 14, a back frame unit 16, and an articulation joint 18 coupling together frame units 14 and 16. The machine 10 may additionally include a power source 20 which can be mounted to frame 12. The power source 20 may embody an engine such as, for example, a diesel engine, a gasoline engine, a gaseous fuel-powered engine, or another type of combustion engine known in the art. However, it is contemplated that power source 20 may alternatively embody a non-combustion source of power such as a fuel cell, a power storage device, or another source known in the art. Furthermore, an operator cab 22 can be mounted to the frame 12 of the machine 10, and a set of ground engaging propulsion elements 24 can be coupled with frame 12 and operatively actuated by the power system 20 in a conventional manner. A hydraulically actuated implement system 26 can be coupled with frame 12, and can include a linkage 28 pivotally and/or movably coupled with the frame 12 and configured to couple with an implement 30. In the illustrated embodiment, linkage 28 includes one or more lift arms, one of which is shown and identified via reference numeral 31, and one or more hydraulic actuators 32 coupled with frame 12 and with linkage 28 for raising and lowering lift arms 31 and implement 30. Thus, hydraulic actuator 32 may include a lift actuator, and the lift arms 31 can be pivotably coupled with frame 12 and can operatively and/or removably couple with implement 30. Descriptions herein of lift arm 31 or hydraulic actuator 32 in the singular should be understood to analogously refer to a plurality of lift arms and lift actuators, and vice versa. Implement system 26, and in one embodiment the linkage 28, may further include a tilt actuator 34 coupled with implement 30 and configured to tilt implement 30 relative to the lift arms 31 in a conventional manner.

In the embodiment illustrated in FIG. 1, machine 10 is shown in the context of an articulated wheel loader such as that which might be used for moving, loading and/or distributing loose material at a work site, or used for a variety of other functions or applications as described herein. However, a variety of other machine 10 types are contemplated within the context of the present disclosure, including but not limited to a motor grader, a skid loader, an excavator, a fork lift, and/or a track-type tractor, or any other machine, including but not limited to the foregoing, which may have ground engaging tracks or wheels as shown. Furthermore, numerous modifications to the basic design of implement system 26 may be made without departing from the scope of the present disclosure. For instance, rather than two lift arms, a single lift arm may be used, and in other alternatives, implement system 26 may be embodied as having one or more one-piece rigid lift arms or a multiple piece linkage including, for instance a stick, a boom and one or more pivot points between the coupling of the linkage with the frame and the coupling with the implement. Additionally, a variety of different implement types might also be used with machine 10. Implement 30 is shown as a bucket, however, implement 30 can be any implement, device, or work tool which operatively attaches to linkage 28 and is engaged and/or actuated by the implement system 26 of machine 10 including but not limited to a blade, a fork, a rotary broom, a snow-blowing or snow removal implement (rotary or otherwise) or any of a variety of other implement types which can be used with any of the variety of machines as disclosed herein.

FIG. 1 also provides an illustration of a substrate 36 which may be a concrete floor below machine 10 and implement system 26, paved or un-paved roadway, parking lot, work site terrain, and/or any other surface or terrain upon which machine 10 may traverse. In one embodiment, a substrate protection pad 38 formed from rubber or the like may be coupled with implement 30 such that moving machine 10 across substrate 36 can slide pad 38 in contact with substrate 36 without scraping substrate 36 with implement 30. Also shown in FIG. 1 is a material pile 40. In one embodiment, the material pile 40 may be a pile of loose waste material located upon substrate 36, and machine 10, in conjunction with implement system 26, may be used to capture, lift and dump material from pile 40 into a haul truck or the like by way of a plurality of successive passes. In other embodiments, material pile 40 may be debris, snow, dirt, or any other material a user wishes to displace, transport, or otherwise engage with the implement 30 via the implement system 26.

A variety of different features may be positioned within operator cab 22 for controlling and operating implement system 26 as well as various additional aspects of machine 10, including one or more control levers 42 (which may be one or more joysticks, actuation levers, and/or yokes, and the like), one or more input devices 44, and one or more displays 46 or similar operator interfaces. The input device or devices 44 can be one or more manually operated buttons, voice activated mechanisms, switches and/or any similar devices and can be positioned within operator cab 22 and coupled with electronic control unit, discussed herein.

The implement system 26 of machine 10 may further include a hydraulic subsystem 48 having a pump 50, a tank 52, and a valve assembly 54 having at least one valve body 56 as well as an accumulator 58. In one embodiment, valve assembly 54 includes a single valve body 56. Alternatively, in addition to valve body 56, valve assembly 54 can include one or more additional valve bodies. A rod side hydraulic conduit 60 extends between hydraulic subsystem 48 and actuator 32, as does a head side hydraulic conduit 62.

In one embodiment machine 10 further includes a control system 64 for implement system 26 having an electronic control unit 66. The electronic control unit 66 can be connected in electronic communication and controllably coupled with a plurality of the various components of the implement system 26, as provided herein. Additionally, the electronic control unit 66 and/or control system 64 can be electronically connected and controllably coupled with the controlling and operating features within the operator cab 22 including but not limited to the input device 44. Furthermore, in one embodiment, the control system 64 and/or electronic control unit 66 may include or be coupled in electronic communication with a computer readable memory such as RAM, ROM, a hard drive, or some other form of memory, wherein the memory may store implement type data as well as valve state data and the electronic control unit 66 may electronically read the stored implement type data and stored valve state data. One embodiment contemplates a multidimensional map having an implement type coordinate and a valve state coordinate. In one example, when electronic control unit 66 outputs one or more control or activation signals to the hydraulic subsystem 48, the control or activation signals may be based upon the stored implement type data and the stored valve state data such that a valve position or valve state is commanded which corresponds with a particular type of implement, or a particular application for an implement. Electronic control unit 66 may determine the implement type presently coupled with implement system 26, for instance, by reading a radio frequency identification device attached to the implement.

Additionally, or in an alternative embodiment, the electronic control unit 66 and control system 64 may be connected in electronic communication to receive, interrogate, or otherwise monitor signals from a plurality of sensors including but not limited to sensors 70, 72, which may be operatively positioned at various locations and/or connected to various components of machine 10 to sense any one or more of a user's manual actuation of control levers 42, implement 30 weight, implement 30 position, implement system 26 weight, implement system 26 position, hydraulic conduit 60 and/or 62 pressure, hydraulic chamber 74 and/or 76 pressure as well as operating characteristics of the machine 10 power source 20, drive train, implement system 26, and/or the particular implement 30 being utilized.

As further disclosed herein, the control system 64, the features positioned within operator cab 22 for controlling and operating various aspects of machine 10, including but not limited to the one or more control levers 42 and the one or more input devices 44, and the various hydraulic and mechanical components of implement system 26 can be mechanically, electronically, hydraulically, and/or otherwise operably connected to provide for the manual, automatic, and/or automated actuation and control of the implement system 26.

Figure 2:
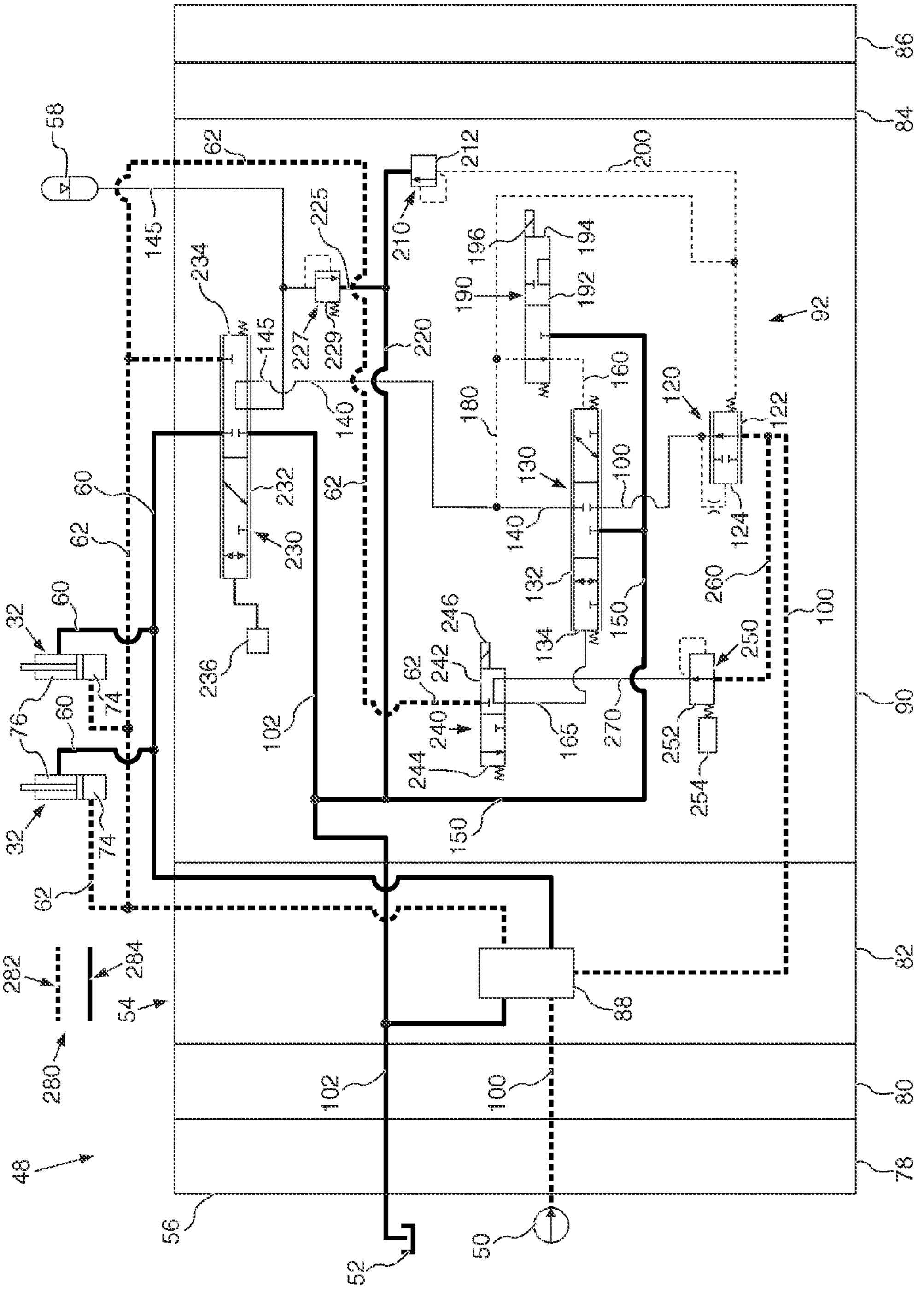
FIG. 2 is a schematic illustration of a hydraulically actuated implement system suitable for use with the machine of FIG. 1, in a first configuration.

The implement system 26 of machine 10 can have a hydraulic subsystem 48 which can include a combined ride control and downforce control circuit as well as a plurality of additional fluid components that, in concert with the additional systems and components of machine 10, and as disclosed herein, can effectuate the actuation and control of the linkage 28, lift arms 31 and the hydraulic actuators 32 of the implement system 26. FIG. 2 presents a schematic view of certain parts of implement system 26 of machine 10, illustrating additional detail over what is shown in FIG. 1. In FIG. 2 (as well as FIG. 3 & FIG. 4), two lift actuators 32 are shown fluidly communicating with valve assembly 54 by way of head side conduit 62 and rod side conduit 60. Reference numeral 74 denotes a head side chamber of each one of actuators 32, whereas reference numeral 76 identifies a rod side chamber, and in one embodiment, rod side conduit 60 extends between and fluidly connects the various components of valve assembly 54 and the rod side chamber 76, and head side conduit 62 extends between and fluidly connects the various components of valve assembly 54 and the head side chamber 74. In one embodiment, valve assembly 54 can include a single valve body 56 which may be mounted on the back frame unit 16 of machine 10, or instead may be mounted on front frame unit 14 in other embodiments. Alternatively, valve assembly 54 can include one or more additional valve assemblies which may be mounted together on back frame unit 16 of machine 10, but the one or more additional valve assemblies might instead be mounted on front frame unit 14 in other embodiments, or integrated into a single valve body. Valve body 56 is shown as a sectional hydraulic valve and is suitable for use in an open center hydraulic system. The present disclosure is not thereby limited, however, and a closed center hydraulic system and/or a variety of different valve body configurations might instead be used. In one embodiment, valve body 56 includes an inlet section 78, a tilt section 80, and a lift section 82. Valve body 56 may still further include an auxiliary section 84 connecting with or incorporating auxiliary hydraulic devices, and an outlet section 86. Tilt section 80 may include various valves and passages adapted for controlling tilt actuator 34 in a conventional manner. Accordingly, tilt section 80 might include an operator controlled tilt valve coupled with one or more of the control levers 42, and also could include additional components which may be in electronic communication and controllably coupled with electronic control unit 66 for automated control, although such features are not specifically shown in FIG. 2. It should also be appreciated that while the present disclosure focuses on controlling lift actuators 32, as alluded to herein, tilt actuator 34 can be controlled in the same manner and for purposes analogous to those discussed herein in connection with lift actuators 32. A lift valve 88 may be located in lift section 82 and operably coupled with one or more of the control levers 42 in a conventional manner, and lift valve 88 may further be in electronic communication and controllably coupled with electronic control unit 66 for automated control. Lift valve 88 and other features within lift section 82 may be understood as a primary hydraulic control circuit.

A plurality of fluid conduits or passages may be provided which direct fluid through the hydraulic subsystem 48 including, in part, valve body 56. In particular, in one embodiment, an inlet passage 100 extends through a plurality of the sections of valve body 56 and fluidly connects with pump 50. An outlet passage 102 similarly extends through a plurality of valve sections of valve body 56 and connects to tank 52. In one embodiment, inlet passage 100 and outlet passage 102 are fluidly connected to lift valve 88. As a result, lift valve 88 as well as additional components included in lift section 82 may be actuated to operably and selectively couple the rod side hydraulic conduit 60 and rod side chambers 76 of the hydraulic actuators 32 as well as head side hydraulic conduit 62 and head side chamber 76 of the hydraulic actuators 32 with pressurized flow from the pump 50 via inlet passage 100 and/or outlet flow to the tank 52 via outlet passage 102 in order to raise and lower the lift arms 31 in response to various signals from the electronic control unit 66 and/or in response to an operator's actuation of the one or more of the control levers 42 when the implement system 26 is in a first state, as illustrated in FIG. 2, such as, for example, during which an operator is able to manually control actuators 32 in a conventional manner.

Figure 3:
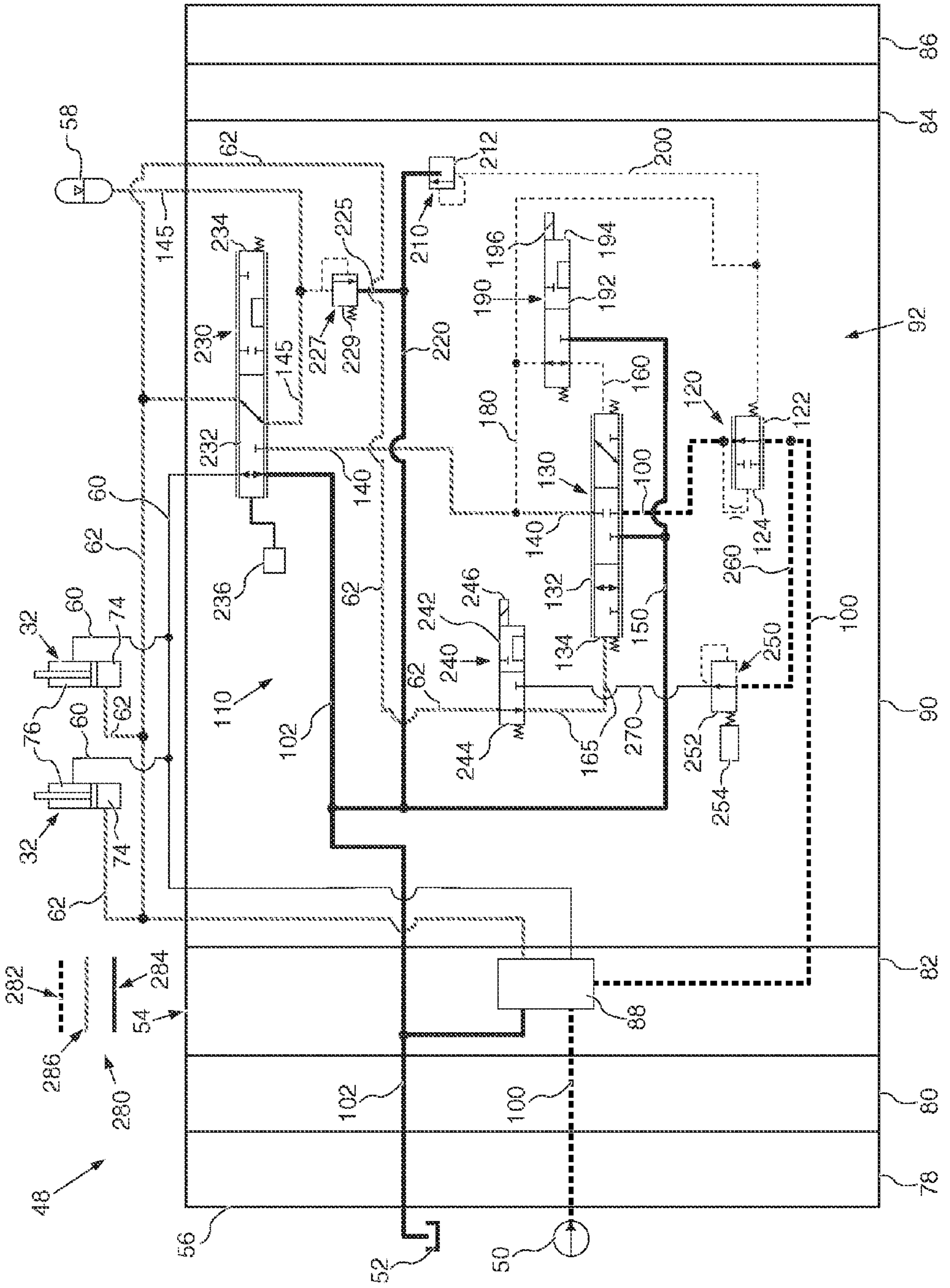
FIG. 3 is a schematic illustration of the hydraulically actuated implement system of FIG. 2, in a second configuration.
Figure 4:
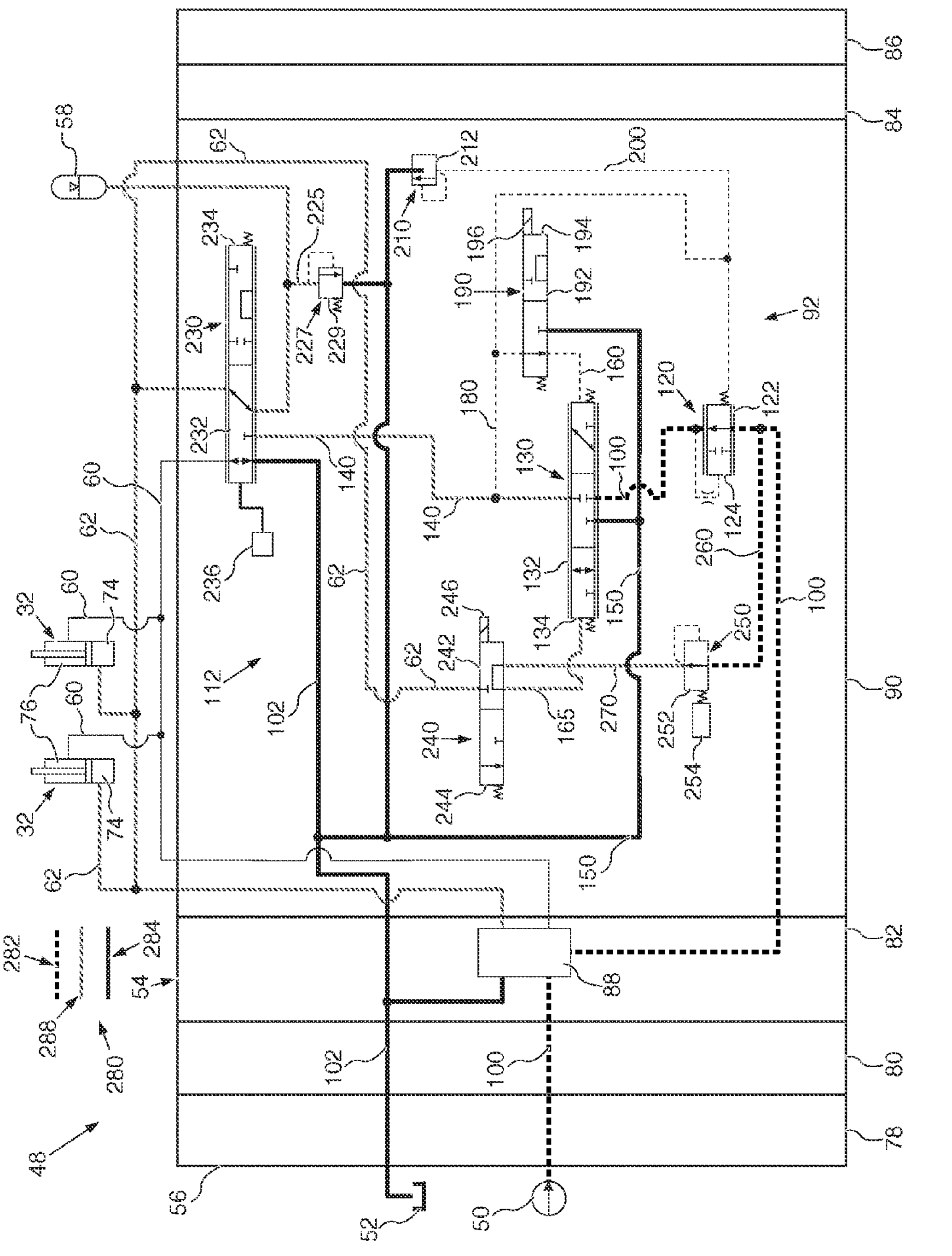
FIG. 4 is a schematic illustration of the hydraulically actuated implement system of FIG. 2, in a third configuration.

In one embodiment, valve body 56 also includes a ride control and downforce control section 90 including a combined ride control and downforce control circuit 92 for purposes further discussed herein. Combined ride control and downforce control circuit 92 can be in electronic communication and controllably coupled with electronic control unit 66 and can include a plurality of components located, for example, in section 90. In one embodiment, the combined ride control and downforce control circuit 92 can be configured to implement a ride control feature of implement system 26 in a ride control mode 110, whereby shocks and vibrations imparted to machine 10 during operation, such as while carrying a bucket load of material or a suspended load with implement 30, can be absorbed. FIG. 3 provides an exemplary illustration of one possible configuration of the combined ride control and downforce control circuit 92 in a ride control mode 110. Furthermore, in the present embodiment, the combined ride control and downforce control circuit 92 of the ride control and downforce control section 90 can additionally be configured to implement a downforce control feature of implement system 26 in a downforce control mode 112 to adjustably apply and maintain the pressure within the head side chambers 74 of the hydraulic actuators 32 at a specific downforce control pressure set by the user or determined by the control system 64 to actuate and/or adjust the lift arms 31 to partially oppose the weight of the linkage 28 and the implement 30 such that implement 30 maintains a reduced down force with the substrate 36 with which it is in contact. FIG. 4 provides an exemplary illustration of one possible configuration of the combined ride control and downforce control circuit 92 in a downforce control mode 112. In one embodiment, when either the ride control feature or the downforce control feature is activated and the ride control and downforce control circuit 92 is accordingly in either the ride control mode 110 or downforce control mode 112, respectively, both or either of which may be activated via the electronic control unit 66 response to a corresponding command from an input device 44 and/or the control system 64, lift valve 88 may be placed in a neutral position and the combined ride control and downforce control circuit 92 can be connected to communicate and control the flow and hydraulic fluid pressure within the head side chambers 74 of the hydraulic actuators 32 as further discussed herein.

The combined ride control and downforce control circuit 92 can be connected in fluid communication with inlet passage 100 and outlet passage 102 and can include a plurality of valves, fluid conduits or passages, and components configured to control fluid connections within implement system 26. In one embodiment, inlet passage 100 fluidly communicates pressurized fluid flow from pump 50 to the ride control and downforce control circuit 92. In particular, in one example, the combined ride control and downforce control circuit 92 as well as the flow of pressurized fluid between the ride control and downforce control circuit 92 and the accumulator 58 are fluidly connected and positioned between a flow of pressurized fluid from pump 50 via inlet passage 100 and the hydraulic actuators 32. As such, upon activation, which can be by fluidly connecting the flow of pressurized fluid from the ride control and downforce control circuit 92 and the accumulator 58 to the actuators 32, the ride control and downforce control circuit 92 can adjust, supply, maintain and fluidly communicate a flow of pressurized fluid to the head side chambers 74 of the hydraulic actuators 32 such that either a ride control pressure or a downforce control pressure is maintained in the head side chambers 74 of the actuators 32 when the ride control and downforce control circuit 92 is actuated to the ride control mode 110 or the downforce control mode 112, respectively, as discussed herein.

The ride control and downforce control circuit 92 can optionally include a first valve 120 disposed within inlet passage 100 which in one embodiment includes a modulation valve 122 with a spool element 124 moveable between a first or open position permitting fluid at pump 50 pressure to be transmitted through the modulation valve 122 to a second position blocking fluid flow therethrough. The spool element 124 of the modulation valve 122 may be spring biased to a first or open position and additionally may be pilot-operated in response to downstream pressure to move to any position between the first and second positions such that a variable amount of fluid from pump 50 may flow into the ride control and downforce control circuit 92 (i.e., spool element 124 may be variable position) through the modulation valve 122.

Additionally, in one embodiment, the ride control and downforce control circuit 92 includes a second valve 130 fluidly connected to the inlet passage 100 and positioned downstream of the modulation valve 122, if present. In one embodiment, the second valve 130 includes a control valve 132, which in one example is a passively operated three position control valve 132, and has a spool or balancing cartridge 134. In an exemplary embodiment, the spool or balancing cartridge 134 of the control valve 132 is disposed between and moveably positioned to selectively block and/or direct the flow of pressurized fluid between the inlet passage 100, an accumulator pressure passage 140, and an outlet connector passage 150. The accumulator pressure passage 140, in one embodiment, is fluidly connected to contain and communicate fluid between the control valve 132 and the accumulator 58. The outlet connector passage 150 can be fluidly connected to the outlet passage 102 such that flow directed into outlet connector passage 150 is fluidly communicated to the tank 52.

The spool or balancing cartridge 134 of the control valve 132 may be spring biased or otherwise maintained at a neutral position and actuated from the neutral position to one or more fluid-directing positions by one or more control pressures on one or both ends. In one embodiment, the spool or balancing cartridge 134 is balanced at a first or middle/neutral position (center position in FIGS. 2, 3 & 4) which blocks the flow of fluid through the valve 132 by opposing springs as well as fluid pressures exerted on opposing ends of the spool or balancing cartridge 134 via control valve spool passages 160, 165. In one embodiment, the spool or balancing cartridge 134 of the pressure control valve 132 also has a second position (left-most position in FIGS. 2, 3 & 4) with a passage which is positioned or opened to fluidly connect and direct pressurized fluid from the inlet passage 100 into the accumulator pressure passage 140. Additionally, in the present embodiment, the spool or balancing cartridge 134 of the control valve 132 includes a third position (right-most position in FIGS. 2, 3 & 4) which blocks the flow of pressurized fluid through the valve from the inlet passage 100 while including a passage which is positioned or opened to fluidly connect the fluid within the accumulator pressure passage 140 with the outlet connector passage 150. In one example, the spool or balancing cartridge 134 of the control valve 132 may be a variable position spool to include a plurality of positions, each of which defining a different state of blockage and/or fluid communication between inlet passage 100, the accumulator pressure passage 140, and outlet passage 102.

Pressure within the accumulator pressure passage 140 can be applied as a feedback or control pressure to one of the opposing ends of the spool or balancing cartridge 134 of the control valve 132. In one embodiment, pressurized fluid within the accumulator pressure passage 140, which can be substantially equivalent and/or proportionate to the pressure of the fluid within the accumulator 58, is fluidly communicated to a control valve spool passage which directs pressurized fluid from the accumulator pressure passage 140 as a feedback or control pressure to one end of the spool or balancing cartridge 134. In one example, an accumulator pressure pilot passage 180 transmits fluid at accumulator pressure passage 140 pressure to a control valve spool passage 160 positioned at the right side/end of spool or balancing cartridge 134 as shown in FIGS. 2, 3 & 4.

In one embodiment, a third valve 190 may optionally be disposed and moveably positioned to actuate the flow of fluid between the accumulator pressure pilot passage 180 and the first control valve spool passage 160. In one example, the third valve 190 can include a switching valve 192 with a spool element 194 which can be electrically actuated or energized/de-energized between first and second positions by an electrical actuator 196. In one embodiment, in response to a signal from the electronic control unit 66, the electrical actuator 196 may energize the spool element 194 from a first position, which is normally open to direct pressurized fluid from the accumulator pressure pilot passage 180 to the valve spool passage 160, to a second position which may block the passage of fluid flow from the accumulator pressure pilot passage 180, and may include one or more passages which fluidly connect the first control valve spool passage 160 with outlet connector passage 150 in order to facilitate charging of the accumulator 58.

The accumulator pressure pilot passage 180 may also include and/or fluidly connect with a relief pilot passage 200 which may transmit a biasing hydraulic fluid pressure signal to the spring of the spool element 124 of the modulation valve 122. The relief pilot passage 200 may also fluidly direct pressurized fluid to a first relief valve 210 with a spool element 212 which may be included in the relief pilot passage 200. The relief valve 210 may be pilot operated in response to upstream pilot pressure such that pressurized fluid within the relief pilot passage 200 which exceeds the threshold pressure setting of the relief valve 210 is directed to the tank outlet via an outlet connector passage 220. Furthermore, the ride control and downforce control circuit 92 may also include an accumulator relief valve 227 disposed within an accumulator relief passage 225 extending between an accumulator passage 145 and the outlet connector passage 220. The accumulator relief valve 227 can have a spool element 229 which can be pilot operated in response to accumulator 58 pressure such that pressurized fluid within the accumulator relief passage 225 which exceeds the threshold pressure setting of the accumulator relief valve 227 is directed to the tank outlet via an outlet connector passage 220.

The ride control and downforce control circuit 92 can also include a fourth valve 230 positioned downstream of the inlet passage 100, the control valve 132 and the accumulator 58 and fluidly connected in between the accumulator pressure passage 140, the accumulator passage 145 and the head side hydraulic conduit 62. The fourth valve 230 can include a control valve 232 having a spool element 234 which may be spring-biased to a first position while in a de-energized state, and actuated by a downforce and ride control actuator 236, such as a downforce and ride control activation valve 236, to move into a second position when energized. The downforce and ride control actuator 236 can be in electronic communication and controllably coupled with the electronic control unit 66 such that the downforce and ride control actuator 236 may actuate the spool element 234 of the control valve 232 between the first and second positions in response to an activation signal from the electronic control unit 66. In one example, the spool element 234 of the control valve 232 can be a variable position spool to include a plurality of energized positions, each of which defining a different state of fluid communication between the combined ride control and downforce control circuit 92 (via accumulator pressure passage 140), the accumulator 58 (via accumulator passage 145) and the head side chambers 74 of the hydraulic actuators 32 (via the head side hydraulic conduit 62).

In one embodiment, the first position of the spool element 234 of the control valve 232, which may be a de-energized position, disconnects and prevents pressurized fluid within the accumulator pressure passage 140 and accumulator 58 from being fluidly communicated to the head side chambers 74 of the hydraulic actuators 32 via the head side hydraulic conduit 62. The first position of the spool element 234 of the control valve 232 may additionally disconnect the transmission of fluid from the rod side chambers 76 of the hydraulic actuators 32 to the outlet passage 102. The second position of the spool element 234, which may be an energized position, may include a passage which is positioned or opened to fluidly connect the head side hydraulic conduit 62 with the accumulator pressure passage 140 such that the pressurized fluid within the accumulator 58 and accumulator pressure passage 140 is fluidly directed into the head side hydraulic conduit 60 and head side chambers 74 of the hydraulic actuators 32. Furthermore, the second position of the spool element 234 may include an additional passage or opening which fluidly connects the rod side hydraulic conduit 60 in communication with the outlet passage 102.

The combined ride control and downforce control circuit 92 additionally includes a fifth valve 240 which, in one embodiment, includes a switching valve 242 fluidly disposed and connected in fluid communication between the head side hydraulic conduit 62 of head side chambers 74 of the hydraulic actuators 32, a pressure reducing valve 250, and control or feedback end of the spool or balancing cartridge 134 of the control valve 132. In one example, the switching valve 242 selectively directs pressurized fluid as a feedback or control pressure to an end of the spool or balancing cartridge 134 from either the head side hydraulic conduit 62 or the pressure reducing valve 250 such that either pressurized fluid from within the head side chambers 74, or alternatively, a flow of pressurized fluid from the pump 50 which is adjusted/reduced from pump 50 inlet pressure via the pressure reducing valve 250, respectively, sets, maintains, balances, adjust, and/or otherwise controls the pressure within the combined ride control and downforce control circuit 92, and accordingly the pressure fluidly transmitted from the accumulator 58 to the head side chambers 74 of the hydraulic actuators 32.

In one embodiment, the switching valve 242 has a spool element 244 which is movable between a first position and a second position. In one example, the spool element 244 may be spring-biased to the first position while in a de-energized state, and actuated by an electrical actuator 246 to move into the second position when energized. The electric actuator 246 can be in electronic communication and controllably coupled with the electronic control unit 66 such that the electrical actuator 246 may actuate the spool element 244 of the switching valve 242 between the first and second positions in response to an activation signal from the electronic control unit 66. In one embodiment, the first position of the spool element 244 of the switching valve 242 includes a passage which is positioned or opened to fluidly connect the head side hydraulic conduit 62 with a second control valve spool passage 165 positioned at the left side/end of spool or balancing cartridge 134 as shown in FIGS. 2, 3 & 4 at the second end of the spool or balancing cartridge 134 opposite of the first control valve spool passage 160. As a result, in this position, the spool element 244 of the switching valve 242 directs fluid at a head side chamber control pressure which is substantially equivalent to that within the head side chambers 74 of the hydraulic actuators 32 to the second end of the spool or balancing cartridge 134 to oppose or counterbalance the first control pressure of the fluid within the accumulator pressure passage 140 exerted on the opposite end of the spool or balancing cartridge.

The second position of the spool element 244 can direct a feedback or control pressure from the pressure reducing valve 250 to an end of the spool or balancing cartridge 134. In one embodiment the pressure reducing valve 250 includes a spool element 252 which is pilot operated in response to downstream pressure to provide an outlet or downstream flow flowing out of the pressure reducing valve 250 having a pressure which is limited to the particular pressure setting of the spool element 252 of the pressure reducing valve 250. In one example, an inlet pressure connector passage 260 fluidly communicates pressurized flow from pump 50 via the inlet passage 100 from a source upstream of the modulation valve 122 to the pressure reducing valve 250, and the pilot actuated spool element 252 provides pressurized flow at a pressure limited to the setting of the valve 250 flowing out of the pressure reducing valve 250 and into a downforce pressure control passage 270 which is connected in fluid communication between the downstream end or outlet of the pressure reducing valve 250 and the spool element 244 of the switching valve 242. In one embodiment, the pressure setting of the pressure reducing valve 250, and in one example, the spool element 252 thereof, can be adjusted and/or set via manual adjustment of an actuator operably associated with the valve 250. Alternatively, or additionally, the pressure setting of the pressure reducing valve 250, and in one embodiment, the spool element 252 thereof, can be adjusted and/or set by an actuator 254, which can include any type of actuator including but not limited to an electronic actuator, hydraulic actuator, electrohydraulic actuator, and the like, which can be in electronic communication and/or otherwise controllably coupled with the electronic control unit 66 such that the pressure setting of the pressure reducing valve 250 can be adjusted and set in response to an activation signal transmitted from the electronic control unit 66 to the actuator 254 of the pressure reducing valve 250.

Accordingly, in one embodiment, when in a first position, the spool element 244 of the switching valve 242 fluidly connects the head side hydraulic conduit 62 with the second control valve spool passage 165, but blocks the flow of pressurized fluid from the downforce pressure control passage 270 and pressure reducing valve 250. In the present embodiment, the second position of the spool element 244 of the switching valve 242 blocks the communication of fluid from the head side hydraulic conduit 62 and includes one or more passages which are positioned or opened to fluidly connect the downforce pressure control passage 270 with the second control valve spool passage 165 positioned at the left side/end of spool or balancing cartridge 134 as shown in FIGS. 2, 3 & 4 at the second end of the spool or balancing cartridge 134 opposite of the first control valve spool passage 160. As a result, in this position, the spool element 244 of the switching valve 242 directs fluid from the pressure reducing valve 250 at a downforce control pressure equivalent to the setting of the pressure reducing valve 250 to the second end of the spool or balancing cartridge 134 to oppose or counterbalance the first control pressure of the fluid within the accumulator pressure passage 140 exerted on the opposite end of the spool or balancing cartridge 134.

The specific fluid components and connections as disclosed herein are meant to serve as an exemplary configuration of a combined ride control and downforce control circuit 92 which can include and utilize, in part, a pressure reducing valve 250 or similar controlling device or valve which provides a flow of fluid at a specific pressure based upon the pressure setting of the valve, as well as a switching valve 242 or similar selector valve which may provide a single, integrated and combined ride control and downforce control circuit 92 which may be capable of providing as well as being capable of switching between both a ride control mode 110 configuration and downforce control mode 112 configuration. However, it is contemplated that the combined ride control and downforce control circuit 92 of the ride control and downforce control section 90 and the additional disclosed sections of valve body 56 may include additional and/or different circuits or components, if desired, and a variety of different hydraulic system architectures might be used to enable the capabilities disclosed herein.

INDUSTRIAL APPLICABILITY

The machine 10 having a hydraulically actuated implement system 26 and the combined ride control and downforce control circuit 92 included therein of the present disclosure may be applicable to a plurality of machines as well as a plurality of implement systems and implements to perform a plurality of functions, and may provide a more compact and/or integrated hydraulic subsystem and/or valve assembly, improve operator performance and control as well as reduce the complexity and difficulty of operating machines and implement systems. The presently disclosed machine 10 having a hydraulically actuated implement system 26 and the combined ride control and downforce control circuit 92 included therein may also eliminate or reduce operator errors as well as damage to implements, implement systems, and surfaces upon which the machines traverse and operate, and additionally may provide the capability to more precisely, accurately, and controllably position implements and/or implement systems based upon factors including but not limited to characteristics of the particular implement being utilized, the surfaces upon which the implements are operating, as well as operational circumstances and interactions in relation to functionally related devices, control systems, and/or attachments, operation cycles, and/or the type of materials displaced, and/or engaged by the machine and/or implement.

In operation, the ride control and downforce control circuit 92 may be activated to switch implement system 26 from a first configuration or mode at which an operator is able to manually control actuators 32 in a conventional manner to either one of two additional configurations or modes, both of which are provided by and/or within the combined ride control and downforce control circuit 92. In particular, the combined ride control and downforce control circuit 92 may be activated to switch implement system 26 to a second configuration or mode, or a ride control mode 110 of the ride control and downforce control circuit 92. In one example, when the ride control and downforce control circuit 92 is engaged and actuated to the ride control mode 110, the ride control and downforce control circuit 92 maintains pressures of hydraulic fluid in actuators 32 generally at a set point, and pressure of the fluid within the accumulator 58 is adjusted to match the pressure within the fluid actuators 32 such that a predetermined ride control pressure is maintained and available within the ride control and downforce control circuit 92 to supply fluid to the head side chambers 74 of the actuators 32 to assist in absorbing shocks and vibrations imparted to the linkage 28 of machine 10 during operation, such as while carrying a bucket load of material or a suspended load with implement 30. Additionally, the ride control and downforce control circuit 92 may be activated to switch implement system 26 to yet another, additional configuration or mode, or a downforce control mode 112 of the ride control and downforce control circuit 92, wherein ride control and downforce control circuit 92 can be engaged and actuated to set, control, and maintain a specific desired downforce control pressure within the head side chambers 74 of the hydraulic actuators 32 to the specific downforce control pressure set by the user or determined by the control system 64 to oppose the weight of the linkage 28 and the implement 30 such that implement 30 is controllably rested upon and contacts or engages the substrate 36 with a reduced down force at a predetermined and/or desired downforce control pressure in a manner further described herein.

In particular, and as further disclosed herein, the implement system 26, utilizing, in part, the combined ride control and downforce control circuit 92, and in particular embodiments, in conjunction with the control system 64, may be configured to maintain the pressure of hydraulic fluid in the hydraulic actuator 32 at a downforce control pressure to partially oppose the weight of the linkage 28 and an implement 30 such that the implement 30 maintains a reduced down force upon substrate 36 based upon any one or more of implement 30 type, implement 30 weight, the demands and limitations of a particular implement 30 being utilized, the specific type of application or work function that the implement 30 is being utilized to perform, and/or conditions specific to the substrate 36 and/or the material that the implement 30 is engaging, as provided herein. The linkage 28 of implement system 26 and the implement 30 may be brought to rest upon substrate 36 by lowering the one or more lift arms 31 until pad 38 or alternatively until a lower surface of the implement 30 contacts substrate 36. Any time implement system 28 is thusly brought to rest, linkage 28 of implement system 26 and the implement 30 will contact substrate 36 via pad 38 or via the lower surface of the implement 30 and will apply a down force to substrate 36 that is substantially equivalent to the resting weight of the linkage 28 of implement system 26 and the implement 30. When implement system 26 is operated such that actuator 32 or actuator 34 opposes a force of gravity while implement 30 and/or pad 38 contacts substrate 36, the down force may be less than a down force defined by a resting weight of implement system 26. Where implement system 26 is operated such that actuator 32 or 34 complement the force of gravity to push implement 30 and/or pad 38 downwardly against substrate 36, the down force may be greater than a down force defined by resting weight of implement system 26. The resting weight, such as might occur where machine 10 is not running and hydraulic subsystem 48 is turned off and the total weight of the linkage 28 of implement system 26 and the implement 30 is brought to rest upon substrate 36, may be understood to define a quiescent down force. The quiescent down force may thus be further understood as the force in a vector direction normal to substrate 36 when implement system 26 is neither pushing down nor pulling up. As provided above and disclosed herein, the combined ride control and downforce control circuit 92 of implement system 26 can be configured to adjust and maintain a pressure of hydraulic fluid in hydraulic actuator 32 at a specific downforce control pressure such that implement 30 is controllably rested upon substrate 36 with a controlled down force such that the controlled down force applied to substrate 36 is less than the quiescent down force. Methodology relating to these capabilities will be further apparent from the following discussion of example configurations or modes of implement system 26 and control of the various components of ride control and downforce control circuit 92.

In one embodiment, the implement system 26 may operate in a first configuration or mode at which ride control is off and down force control is off, such as that in which the operator desires manual control. In one embodiment, the first mode, which may be a manual control mode, may be activated by a first or manual control activation command. The manual control activation command may be initiated by the user and generated via a user's actuation of an input device 44, which can comprise a manually operated button, voice activated mechanism, switch or the like positioned within operator cab 22 and coupled with electronic control unit 66 and/or control system 64. Alternatively, or additionally, the manual control activation command may be generated autonomously and/or automatically by the control system 64, which in one example can be in response to output from sensors, such as one or more of sensors 70, 72, which may be coupled and/or operatively associated with control levers 42 to sense a user's manual actuation of control levers 42 and/or in response to signals from an input device 44 indicative of a user's intent or attempt to actuate the implement system 26 manually. The first or manual control activation command may be electronically transmitted to electronic control unit 66 from the input device 44 and/or the control system 64, and in response to the first or manual control activation command, the electronic control unit 66 may electronically transmit one or more signals actuating the components within valve body 56 to a first or manual control configuration or mode.

As provided above, FIG. 2 provides an exemplary illustration which is representative of one possible configuration of a hydraulic subsystem 48 in a first mode, such as that in which the operator desires manual control, and a legend 280 is shown which indicates pressures which may be present in various fluid passages of system 26. In particular, reference numeral 282 indicates a pattern used to show passages which may be at or close to a pump 50 outlet pressure, particularly where lift control valve 88 is in a raised position, whereas reference numeral 284 is used to indicate a different pattern showing passages which are at or close to a tank 52 pressure. In one example as illustrated in FIG. 2, in response to the first or manual control activation command, the electronic control unit 66 may electronically transmit one or more signals energizing or actuating the lift valve 88 as well as additional components included in lift section 82 to and/or between any one or more active states which may facilitate manual control of the implement system 26 in response to the user's actuation of one or more control levers 42. As additionally illustrated in FIG. 2, in response to the first or manual control activation command, the electronic control unit 66 may additionally transmit a signal to the downforce and ride control activation valve 236 such that the spool element 234 of the control valve 232 is de-energized, maintained, or otherwise actuated to the first position, thereby disconnecting the head side hydraulic conduit 62 and head side chambers 74 of the hydraulic actuators 32 from the combined ride control and downforce control circuit 92 and actuating pressurized fluid flow from the accumulator 58 supplied via the combined ride control and downforce control circuit 92. As a result, this may be understood as a state at which the combined ride control and downforce control circuit 92, and accordingly ride control mode 110 and downforce control mode 112, are deactivated, and pressures of hydraulic fluid at various points throughout implement system 26 may be determined based at least in part upon the actuation and/or position of lift valve 88 controlled, in part, by an operator's manipulation of control levers 42.

When desirable to activate either ride control or downforce control mode, the combined ride control and downforce control circuit 92 can be engaged and connected in fluid communication with the head side chambers 74 of the hydraulic actuators 32. In one example the combined ride control and downforce control circuit 92 may be engaged or activated by actuating or energizing the spool element 234 of the control valve 232 to the second position via a downforce and ride control circuit activation signal from the electronic control unit 66 to the downforce and ride control actuator 236 in response to either a ride control activation command or downforce control activation command, as disclosed herein. Furthermore, in response to either the ride control activation command or downforce control activation command, lift control valve 88 may be actuated to a neutral position, which may be via a signal from the electronic control unit 66.

The combined ride control and downforce control circuit 92 may be activated to switch implement system 26 from a first configuration or mode at which an operator is able to manually control actuators 32 in a conventional manner to a second configuration or mode, or a ride control mode 110. In one embodiment, the ride control mode 110 may be activated by a ride control activation command. The ride control activation command activating ride control mode 110 may be initiated by the user and generated via a user's actuation of an input device 44, which can comprise a manually operated button, voice activated mechanism, switch or the like positioned within operator cab 22 and coupled with electronic control unit 66 and/or control system 64. Alternatively, or additionally, the ride control activation command may be generated autonomously and/or automatically by one or more of the electronic control unit 66, the control system 64, and/or an input device 44. In one particular embodiment, the ride control activation command may be generated autonomously and/or automatically in response to one or more of signals, data, settings, user inputs, and other information electronically or otherwise communicated by and between one or more of the electronic control unit 66, the control system 64, an input device 44, computer readable memory, and the plurality of sensors including but not limited to sensors 70, 72, which may be operatively associated with various components of machine 10, as described herein.

In one embodiment, the ride control activation command may be electronically transmitted to electronic control unit 66 from the input device 44 and/or the control system 64, and in response to the ride control activation command, the electronic control unit 66 may electronically transmit one or more signals which engage the combined ride control and downforce control circuit 92 and actuate the components of the combined ride control and downforce control circuit 92 such that the ride control mode 110 is activated. In particular, in one example, in response to the ride control activation command, the electronic control unit 66 may transmit a signal such that the lift control valve 88 is actuated to a neutral position, and may additionally transmit a downforce and ride control circuit activation signal to the downforce and ride control actuator 236 such that the spool element 234 of the control valve 232 is actuated to the second position which connects the head side hydraulic conduit 62 with the accumulator passage 145 such that the pressurized fluid within the accumulator 58 from the and accumulator pressure passage 140 of the combined ride control and downforce control circuit 92 is fluidly directed into the head side hydraulic conduit 62 and head side chambers 74 of the hydraulic actuators 32. In addition to the downforce and ride control circuit activation signal, upon receipt of the ride control activation command, the electronic control unit 66 can also transmit a ride control activation signal to the electrical actuator 246 of the switching valve 242 such that the spool element 244 is actuated to or maintained at a first or ride control position to thereby implement the ride control mode 110 of the combined ride control and downforce control circuit 92. FIG. 3 provides an exemplary illustration of implement system 26 depicting pressures in the various passages as they might appear where the combined ride control and downforce control circuit 92 is activated and in a ride control mode 110, and downforce control mode 112 is off. Legend 280 also shows via reference numeral 286 a different pressure which prevails in head side chambers 74, as well as other passages within the combined control and downforce control circuit 92. In particular, the pressure illustrated via reference numeral 286 may be fluid pressure maintained at a desired ride control pressure 286 by the control and downforce control circuit 92 while actuated to the ride control mode 110. Accordingly, in one embodiment, when the combined ride control and downforce control circuit 92 is in a ride control mode 110 as illustrated in FIG. 3, the spool element 244 of the switching valve 242 is in the first or ride control position which directs pressure from the head side chambers 74 of the hydraulic actuators 32 to the spool or balancing cartridge 134 of the control valve 132 such that the spool or balancing cartridge 132 of the pressure control valve 134 may be actuated by and balanced between opposing pressures within the head side chambers 74 and the accumulator 58.

In particular, with this configuration, any pressure differential between these opposing pressures may cause the spool or balancing cartridge 134 to be actuated from the first or middle/neutral position to either of the second or third positions to selectively adjust the pressure within the combined ride control and downforce control circuit 92 by fluidly connecting accumulator pressure passage 140 with either pressurized flow from the pump 50 via inlet passage 100 or outlet flow to the tank 52 via outlet connector passage 150, respectively, such that the pressure of the accumulator 58 is matched with the pressure of the head side chambers 74 of the hydraulic actuators 32 and maintained at the desired ride control pressure 286. Therefore, in one embodiment, the combined ride control and downforce control circuit 92, while in a ride control mode 110, not only may utilize feedback from the head side chambers 74 of the hydraulic actuators 32 to maintain the desired ride control pressure 286 within the accumulator 58 as well as the head side chambers 74, but also may utilize pressure within the accumulator pressure passage 140 as feedback to limit and/or block the flow of pressurized fluid from the pump 50 to the combined ride control and downforce control circuit 92, and/or direct pressure therein exceeding the desired ride control pressure 286 to the tank outlet passage 102. In this manner, and in one embodiment, when the ride control and downforce control circuit 92 is set to the ride control mode 110 by the actuation of the switching valve 242 to the first or ride control position, the pressure within the accumulator 58 is balanced and adjusted to match the pressure of the fluid within the head side chambers 74 of the hydraulic actuators 32 such that a ride control pressure 286 within the head side chambers 74 of the actuators 32 as well as the combined ride control and downforce control circuit 92 and accumulator 58 is maintained to assist in absorbing shocks and vibrations imparted to machine 10 and stabilize the linkage 28 and implement 30 during operation, such as while carrying a bucket load of material or a suspended load with implement 30.

The ride control and downforce control circuit 92 may additionally be activated to switch implement system 26 to yet another, additional configuration or mode, or a downforce control mode 112 wherein the combined ride control and downforce control circuit 92 can be used to adjust, set and maintain a specific desired downforce control pressure of the hydraulic fluid supplied to and maintained within the hydraulic actuators 32 to control the down force of implement system 26, and accordingly, the position or engagement of the linkage 28 and implement 30 with respect to the substrate 36. In one example, the specific downforce control pressure of the hydraulic fluid is supplied to and maintained within the hydraulic actuators 32 to partially oppose the weight of the linkage 28 and the implement 30 such that implement 30 is controllably rested upon substrate 36 with a controlled down force which can be less than the quiescent down force wherein the specific downforce control pressure can be selected or determined based, in part, upon the characteristics of the implement 30, as provided herein. In one embodiment, the downforce control mode 112 may be activated by a downforce control activation command. The downforce control activation command may be initiated by the user and generated via a user's actuation of an input device 44, which can comprise a manually operated button, voice activated mechanism, switch or the like positioned within operator cab 22 and coupled with electronic control unit 66 and/or control system 64. Alternatively, or additionally, the downforce control activation command activating the downforce control mode 112 may be generated autonomously and/or automatically by one or more of the electronic control unit 66, the control system 64, and/or an input device 44.

Furthermore, in one embodiment, the electronic control unit 66, in conjunction with the control system 64 and additional components as described herein, can be configured to receive and/or generate a plurality of specific implement 30 down force control commands, and in response to the particular down force control command, the electronic control unit 66 of the control system 64 can adjust a pressure of hydraulic fluid in hydraulic actuator 32 to a specific downforce control pressure to actuate and/or position the linkage 28 such that implement 30 connected thereto rests upon substrate 36 with a controlled down force on substrate 36 which can be less than the quiescent down force, consistent with and/or required by a setting of the particular down force control command. In one embodiment, a downforce control command can be generated in response to and include a specific downforce control pressure or a specific downforce control pressure setting specified and input by the user via actuation of an input device 44, which can comprise a manually operated button, voice activated mechanism, switch or the like positioned within operator cab 22 and coupled with electronic control unit 66 and/or control system 64. A downforce control command can additionally or alternatively be generated in response to and include a specific downforce control pressure determined and set autonomously and/or automatically by any one or more of the input device 44, the electronic control unit 66, and/or the control system 64 based upon, for example, one or more automated or manual commands, signals, data, settings, user inputs, and other information electronically or otherwise communicated by and between one or more of the electronic control unit 66, the control system 64, an input device 44, computer readable memory, and the plurality of sensors including but not limited to sensors 70, 72, operatively associated with various components of machine 10, as described herein. As a result, in one embodiment, the control system 64 may be utilized in conjunction with an implement recognition system and/or may utilize a variety of stored and/or sensed, real-time data and information, as provided herein, including but not limited to any one or more of implement 30 weight, implement 30 position, implement system 26 weight, implement system 26 position, hydraulic conduit 60 and/or 62 pressure, hydraulic chamber 74 and/or 76 pressure as well as operating characteristics of the machine 10 power source 20, drive train, implement system 26, and/or the particular implement 30 being utilized such that a specific downforce control pressure can be determined to actuate and/or position the linkage 28 and implement 30 based upon any one or more of the type as well as the weight, demands, and limitations of a particular implement 30 being utilized, the specific type of application or work function that the implement 30 is being utilized to perform, and/or conditions specific to the implement system 26, substrate 36 and/or the material 40 that the implement 30 is engaging. In particular, different implements 30, such as buckets, blades, forks, rotary brooms, snowblowing attachments, and the like, any of which could be attached to the machine 10 and actuated by the machine's linkage 28, lift arms 31, hydraulic actuators 32, and additional mechanical and/or hydraulic power connections of implement system 26, may have different weights as well as well as a variety of different operating parameters and requirements based upon specific characteristics of the particular implement 30 being used. In one example, a first downforce control command may apply a first downforce control pressure based upon a sensed weight and/or recognition of a first implement 30 type such as a bucket in addition to automated or manual input signals (such as, including but not limited to, those from sensors 70, 72 and/or input device 42) that the bucket is being utilized with a substrate protection pad 38 on a concrete substrate 36 such that an appropriate amount of downforce (first downforce control pressure) is supplied to and maintained within the head side chambers 74 of the hydraulic actuators 32 by the combined ride control and downforce control circuit 92 as discussed herein to partially oppose the weight of the linkage 28 and the implement 30, such that the implement 30 and substrate protection pad 38 applies a reduced down force pressure to the substrate 36 which is substantially equivalent and/or proportionate to the first downforce control pressure to ensure that the substrate protection pad 38 engages the concrete floor substrate 36 while at the same time preventing damage to the concrete floor substrate 36 as well as damage and/or excessive wear to the substrate protection pad 38. Alternatively or additionally, in an embodiment wherein second or third implement 30 type, such as a floor brush or snowblowing attachment, is operatively attached to the implement system 26 of the machine 10, a second or third downforce control command may apply a second or third downforce control pressure based upon a sensed weight and/or recognition of the floor brush or snowblowing attachment (respectively) such that an appropriate amount of downforce (second, third downforce control pressure) is supplied to the head side chambers 74 of the hydraulic actuators 32 by the combined ride control and downforce control circuit 92 as discussed herein to partially oppose the weight of the linkage 28 and the implement 30 with respect to the substrate 36 such that the floor brush or snowblowing implement 30 attachment engages the substrate 36 and applies a reduced down force pressure thereto consistent with, substantially equivalent and/or proportionate to the (second, third, respectively) downforce control pressure to prevent damage to substrate 36 as well as damage and/or excessive wear to the particular floor brush or snowblowing attachment implement 30 used.

In one embodiment, the downforce control activation command can be electronically transmitted to electronic control unit 66 from the input device 44 and/or the control system 64, and in response to the downforce control activation command, the electronic control unit 66 can electronically transmit one or more signals which engage the combined ride control and downforce control circuit 92 and actuate the components of the combined ride control and downforce control circuit 92 such that the downforce control mode 112 is activated. In particular, in one example, in response to the downforce control activation command, the electronic control unit 66 can transmit a signal such that the lift control valve 88 is actuated to a neutral position, and can additionally transmit a downforce and ride control circuit activation signal to the downforce and ride control actuator 236 such that the control valve 232 is actuated to the second position which connects the head side hydraulic conduit 62 with the accumulator pressure passage 140, as provided herein. In addition to the downforce and ride control circuit activation signal, upon receipt of the downforce control activation command, the electronic control unit 66 can also transmit a downforce control activation signal to the electrical actuator 246 of the spool element 244 of the switching valve 242 such that the spool element 244 of the switching valve 242 is actuated to the second or a downforce control position.

Furthermore, a downforce control command can additionally be electronically transmitted to electronic control unit 66 from the input device 44 and/or the control system 64. In one embodiment, a specific downforce control command can be electronically transmitted to electronic control unit 66 from the input device 44 and/or the control system 64 in conjunction with the downforce control activation command, wherein in one example, a downforce control command may be combined with the downforce control activation command, or alternatively may be provided as a separate command. Furthermore, one or more additional specific downforce control commands can be transmitted to electronic control unit 66, either separately or in conjunction or combination with subsequent downforce control activation commands, wherein in one embodiment, a first downforce control command can be transmitted to the electronic control unit 66 to implement a first downforce control pressure with a downforce control activation command, and a second (or third) downforce control command can be transmitted to the electronic control unit 66 to implement a second (or third) downforce control pressure, either while the combined ride control and downforce control circuit 92 is activated to the downforce control mode 112, or during a subsequent activation of the downforce control mode 112.

In response to a downforce control command, the electronic control unit 66 can transmit a downforce control pressure signal to the actuator 254 of the pressure reducing valve 250 which adjusts the downforce control pressure setting of the pressure reducing valve 250 to the desired downforce control pressure or specific downforce control pressure setting specified and input by the user, or, alternatively, to the specific downforce pressure determined and set autonomously and/or automatically by any one or more of the input device 44, the electronic control unit 66, and/or the control system 64, as provided by the downforce control command. Additionally, or alternatively a user may manually actuate the pressure reducing valve 250 via adjustment of an actuator or other hydraulic, mechanical, or electronic controls (or a combination thereof) such that the pressure reducing valve 250 is set or adjusted to provide a desired downforce control pressure to be maintained within the ride control and downforce control circuit 92 during downforce control mode 112.

FIG. 4 provides an exemplary illustration of implement system 26 depicting pressures in the various passages as they might appear where the combined ride control and downforce control circuit 92 is activated and in a downforce control mode 112, and ride control mode 110 is off. Legend 280 also shows via reference numeral 288 a different pressure which prevails in head side chambers 74, as well as other passages within the combined control and downforce control circuit 92. In particular, the pressure illustrated via reference numeral 288 may be fluid pressure maintained at a downforce control pressure 288 consistent with the desired downforce control pressure specified and input by the user manually or via an input device 44, or the specific downforce pressure determined and set autonomously and/or automatically the input device 44, the electronic control unit 66, and/or the control system 64, as provided herein. Accordingly, in one embodiment, when the combined ride control and downforce control circuit 92 is in a downforce control mode 112, the second or downforce control position of the switching valve 242 disconnects the spool or balancing cartridge 134 of the pressure control valve 132 from the actuating and/or feedback control pressure from the head side chambers 74 and instead fluidly directs pressurized flow at the desired downforce control pressure 288 from the pressure reducing valve 250 as a control or actuating pressure to the spool or balancing cartridge 134 of the control valve 132. With this configuration, the spool or balancing cartridge 134 of the pressure control valve 132 is actuated by and balanced between pressurized fluid at the desired downforce control pressure 288 from the pressure reducing valve 250 as well as a feedback pressure from within the combined control and downforce control circuit 92. As a result, when the ride control and downforce control circuit 92 is set to the downforce control mode 112 by the actuation of the switching valve 242 to the second or downforce control position, the pressure reducing valve 250 may fluidly actuate the spool or balancing cartridge 134 of the control valve 132 between its first, second, and third positions as disclosed herein to adjust the accumulator 58 setting and accordingly adjust and maintain the pressure of the fluid contained within the combined control and downforce control circuit 92 and transmitted between the accumulator 58 as well as head side chambers 74 of the hydraulic actuators 32 at the downforce control pressure 288 setting of the pressure reducing valve 250. Additionally, the combined ride control and downforce control circuit 92, when set to the downforce control mode 112, may utilize pressure within the accumulator pressure passage 140 as feedback to limit and/or block the flow of pressurized fluid from the pump 50 to the combined control and downforce control circuit 92, and/or direct accumulator 58 pressure therein which exceeds the downforce control pressure 288 setting to the tank outlet passage 102. In this manner, when the ride control and downforce control circuit 92 is set to the downforce control mode 112 by the actuation of the switching valve 242 to the second position, the pressure reducing valve 250 adjusts and maintains not only the pressure of the fluid within the accumulator pressure passage 140 and accumulator 58, but also pressure of the fluid within the head side chambers 74 of the hydraulic actuators 32 at a downforce control pressure 288 which is substantially equivalent and proportional to the downforce control pressure setting of the pressure reducing valve 250.

As a result, the hydraulically actuated implement system 26 and the combined ride control and downforce control circuit 92 included therein of the present disclosure may provide a greater degree of precision and control by providing the ability to adjust, apply and maintain a specific downforce control pressure 288 within the head side chambers 74 of the hydraulic actuators 32 consistent with that set by the user or determined by the control system 64 to oppose the weight of the linkage 28 and the implement 30 such that implement 30 is controllably rested upon substrate 36 with an appropriate amount of down force pressure. Furthermore, the hydraulically actuated implement system 26 and the combined ride control and downforce control circuit 92 included therein of the present disclosure may provide the ability to more responsively modulate and control the position, operation, and pressures of an implement system 26 based upon the weight, demands, and limitations of a particular implement 30 being utilized, the specific type of application or work function that the implement 30 is being utilized to perform, and/or conditions specific to the substrate 36 and/or the material 40 that the implement 30 is engaging. Additionally, the hydraulically actuated implement system 26 and the combined ride control and downforce control circuit 92 included therein of the present disclosure may eliminate or reduce operator errors as well as damage to implements, implement systems, and surfaces upon which the machines traverse and operate with a more compact and/or integrated hydraulic subsystem and/or valve assembly.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A machine comprising:

a frame;

ground engaging propulsion elements coupled with the frame;

a hydraulically actuated implement system coupled with the frame, and including a linkage configured to couple with an implement, a hydraulic actuator coupled with the linkage and the frame, and a combined ride control and downforce control circuit configured to implement a ride control mode and a downforce control mode, the combined ride control and downforce control circuit including a switching valve, the switching valve configured to actuate the ride control and downforce control circuit between the ride control mode and downforce control mode;

the ride control mode configured to maintain a pressure of hydraulic fluid in the hydraulic actuator at a ride control pressure; and the downforce control mode configured to maintain the pressure of hydraulic fluid in the hydraulic actuator at a downforce control pressure to oppose the weight of the linkage and the implement such that the implement is controllably rested upon and engages a substrate positioned under the implement with a predetermined down force pressure which is proportionate to the downforce control pressure, wherein a downforce control position of the switching valve is configured to actuate the combined ride control and downforce control circuit to the downforce control mode and adjust the pressure of hydraulic fluid in the hydraulic actuator to the downforce control pressure.

2. The machine of claim 1 wherein the combined ride control and downforce control circuit includes a pressure reducing valve, the pressure reducing valve configured to provide an outlet flow of pressurized fluid at the downforce control pressure based upon a pressure setting of the pressure reducing valve.

3. The machine of claim 2 wherein the combined ride control and downforce control circuit is connected in fluid communication between a hydraulic pump and the hydraulic actuator.

4. The machine of claim 3 wherein the switching valve is connected in fluid communication between the pressure reducing valve and the hydraulic actuator, and the pressure reducing valve is connected in fluid communication between the hydraulic pump and the switching valve.

5. The machine of claim 4 wherein a ride control position of the switching valve is configured to actuate the combined ride control and downforce control circuit to the ride control mode and adjust the pressure of hydraulic fluid in the hydraulic actuator to the ride control pressure provided by a feedback pressure from the hydraulic actuator.

6. The machine of claim 5 wherein the switching valve and the pressure reducing valve are each electronically actuated by and controllably coupled with an electronic control unit.

7. The machine of claim 6 wherein the electronic control unit is configured to receive an implement down force control activation command, and responsively actuate the switching valve to the downforce control position and adjust the pressure setting of the pressure reducing valve to the downforce control pressure.

8. A control system for a hydraulically actuated implement system in a machine comprising:

an electronic control unit in electronic communication with a combined ride control and downforce control circuit, the combined ride control and downforce control circuit connected in fluid communication between a hydraulic pump and a hydraulic actuator, the combined ride control and downforce control circuit including a switching valve configured to actuate the ride control and downforce control circuit between the ride control mode and downforce control mode;

the electronic control unit configured to receive a ride control activation command, and responsively actuate the combined ride control and downforce control circuit to a ride control mode, the ride control mode maintaining a pressure of hydraulic fluid in the hydraulic actuator at a ride control pressure;

the electronic control unit configured to receive a downforce control activation command, and responsively actuate a downforce control position of the switching valve that is configured to actuate the combined ride control and downforce control circuit to a downforce control mode, the downforce control mode maintaining the pressure of hydraulic fluid in the hydraulic actuator at a downforce control pressure to oppose the weight of a linkage and an implement such that the implement engages a substrate positioned under the implement with a down force pressure which is proportionate to the downforce control pressure.

9. The control system of claim 8 wherein the electronic control unit is configured to receive one or more downforce control commands, and responsively adjust the downforce control pressure of the hydraulic fluid in the hydraulic actuator to a pressure specified by each of the one or more implement downforce control commands.

10. The control system of claim 9 wherein the downforce control pressure is determined by the control system based upon implement type.

11. The control system of claim 9 wherein the downforce control pressure is a user-specified downforce control pressure electrically transmitted to the electronic control unit from an input device.

12. The control system of claim 10 wherein the combined ride control and downforce control circuit includes a pressure reducing valve, and wherein the electronic control unit is configured to adjust a downforce control pressure setting of the pressure reducing valve to a pressure specified by one of the one or more implement downforce control commands.

* * * * *